Patented Oct. 4, 1932

1,880,491

UNITED STATES PATENT OFFICE

FRITZ ROTHE AND HANS BRENEK, OF BERLIN, GERMANY, ASSIGNORS TO THE FIRM KALI-CHEMIE AKTIENGESELLSCHAFT, OF BERLIN, GERMANY

PRODUCING CALCINED PHOSPHATES

No Drawing. Application filed November 19, 1928, Serial No. 320,528, and in Germany November 23, 1927.

This invention relates to improvements in the production of calcined phosphates. For producing fertilizers containing phosphorus two methods are employed to-day of transforming the phosphoric acid of the natural phosphorites into a modification which is easily absorbed by plants. The first method consists in treating the phosphorites with sulfuric acid and transforming the phosphoric acid into a water-soluble form. The second method is based upon a calcining process in which the mineral is broken up by means of alkali compounds in combination with silicic acid, lime and alkaliferous rocks. This method yields products containing the phosphoric acid soluble in citric acid or a citrate. Lately the methods of producing calcined phosphates with citrate-soluble phosphoric acid have been of especial interest. In this case "citrate-soluble" means soluble in ammoniacal citrate solution according to Petermann, this form of phosphoric acid being equivalent to the water-soluble phosphoric acid in superphosphates.

However only a few of the various processes for making calcined phosphates have been practically used, as either the phosphoric acid was not broken up to a sufficient extent or the calcination required temperatures which no ceramic furnace-lining could withstand for long (see, for instance, Bräuer-D'Ans, Fortschritte der anorganisch-chemischen Industrie (Progresses of Inorganic-Chemical Industry), vol I, 2nd part, pages 2266 and 2270).

Only recently chemists have succeeded in discovering processes which permit of practically completely transforming phosphorites into the citrate-soluble form, using a minimum amount of fluxes at temperatures at which the destruction of the furnace material is excluded. In these new processes all the substances engaged in the calcining process are employed in determined molecular quantities. The most favorable temperatures for the breaking up operation are at about 1100–1200° C.

However these processes are subject to drawbacks which are that, in spite of the relatively low temperatures, the reaction mixture strongly sinters or even melts and the practically complete solubility in ammoniacal citrate solution is not attained.

Exact experiments have now shown that this phenomenon is due to a content of calcium fluoride in the phosphorites used as raw material. If the amount of calcium fluoride exceeds 2%, at any rate, melting or strong sintering and unsatisfactory citrate-solubility are to be feared. Such mixtures melt already at temperatures of about 1050° C. and it is very difficult to complete the breaking-up operation when once melting has taken place.

The detrimental action of the calcium flouride may be eliminated by carrying out the process in the presence of steam. However, when steam is used, melting or sintering of the reaction mixture often occurs, and this prevents the production of a product that is almost completely soluble in an ammoniacal citrate solution. The cause of this was known to be that the calcium fluoride content of the mixture at the moment when the proper breaking-up temperature was reached was still so high that the unfavorable action of the calcium fluoride could make itself conspicuous.

Further exhaustive investigations have shown that at the moment when the temperature reaches about 1000° C., no more than about 1% of fluorine (according to 2% of $CaF_2$) should be present, if melting or sintering is to be avoided.

Therefore the calcination must be conducted in such a way that the greater part of the fluorine is expelled from the reaction mixture at temperatures below 1000° C. so that the mixture contains no more than about 1% of fluorine.

Hereupon the mass is heated to the proper breaking-up temperature. A temperature of about 1100 to 1200° C. suffices for this purpose. Heating to higher temperatures does not impair in this case the breaking-up operation, as after removal of the main quantity of the fluorine the danger of melting no longer exists. The time required for expelling the fluorine is by far greater than the time for breaking-up. The fluorine is split off partly as an alkali fluoride, partly as silicon fluoride or hydro-fluoric acid. By employing steam the velocity of this reaction may be considerably increased as already explained in connection with the above described former publication. But carrying out the calcination and the heating periods at separate times is advantageous in all cases and guarantees safe working on an industrial scale.

Therefore for carrying out the calcination, for instance, in a rotary furnace it is necessary to conduct and control the flame in such a way that about ¼ of the furnace length is heated to the breaking-up temperature of about 1100–1150° C. and about 2/4 to temperatures of about 800–1000° C., whereas in the last fourth up to the escape of the fire gases the charge is preheated.

Examples

1. A constantine phosphate was employed having the following composition:—

|  | Per cent |
|---|---|
| $P_2O_5$ | 30.45 |
| CaO | 49.17 |
| F | 4.12 |
| $SiO_2$ | 0.52 |
| $Al_2O_3 + F_2O_3$ | 0.42 |

100 parts of this phosphate were mixed with 23 parts of soda ash and 12.5 parts of finely ground arenaceous quartz. This mixture was calcined in a reverberatory furnace, being repeatedly turned over with a shovel, at a temperature of 900–950° C. for two hours. It then contained 0.75% F. Now the mass was heated to 1150° C. for half an hour and a sintered product was obtained containing 26.35% of total $P_2O_5$ and 26.03% of citrate-soluble $P_2O_5$, i. e. the solubility in ammoniacal citrate solution according to Petermann amounted to 98.78%.

2. The same mixture as indicated in Example 1 was calcined in a reverberatory furnace with the addition of steam to the fire gases at a temperature of 900–950° C. for one hour. The calcined product now contained 0.8% F. On further heating for half an hour to about 1150° C. a calcined product was obtained containing 26.5% of total $P_2O_5$ and 26.1% of citrate-soluble $P_2O_5$, i. e. the solubility in ammoniacal citrate solution according to Petermann amounted to 98.6%.

3. A mixture of the above composition was calcined in a rotary furnace in which the temperatures were controlled in such a manner that they amounted to 1150° C. in the first fourth near the delivery opening, to 1000–800° C. in the second and third fourths, to 600° C. on an average in the last fourth near the charging opening. The product contained 26.92% of total $P_2O_5$, 26.33% of citrate-soluble $P_2O_5$ and 0.83% of F. The solubility according to Petermann amounted to 97.78%.

4. 100 parts of the above-mentioned Constantine phosphate were mixed with 19 parts of finely ground arenaceous quartz, 37.3 parts of potassium sulfate and 21.4 parts of calcium carbonate. This mixture was calcined in a rotary furnace as in Example 3, steam being conducted over the mass. The calcined product contained 19.7% of citrate-soluble $P_2O_5$, 20.5% of total $P_2O_5$, 13.6% $K_2O$, 0.7% F. The solubility in ammoniacal citrate solution according to Petermann amounted to 96%.

We claim:—

The process of producing calcined phosphates from phosphorites rich in fluorine, which comprises the steps of mixing the phosphorite with suitable fluxes, heating the mixture to a temperature of between 800° C. and 1000° C. for a period of substantially two hours in order to reduce the fluorine content of the mixture to 1% or below, during this step of the process melting or sintering of the phosphorite being avoided, and then heating the mixture to a temperature of between 1000° C. and 1200° C. in order to complete the breaking up of the mixture.

In testimony whereof we affix our signatures.

FRITZ ROTHE.
HANS BRENEK.